(12) United States Patent
Qiu et al.

(10) Patent No.: US 7,330,893 B2
(45) Date of Patent: Feb. 12, 2008

(54) ADAPTIVE ALLOCATION OF LAST-HOP BANDWIDTH BASED ON MONITORING OF END-TO-END THROUGHPUT

(75) Inventors: Lili Qiu, Bellevue, WA (US); Paramvir Bahl, Sammamish, WA (US); Atul Adya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/232,572

(22) Filed: Sep. 21, 2005

(65) Prior Publication Data
US 2006/0020700 A1    Jan. 26, 2006

Related U.S. Application Data

(62) Division of application No. 10/144,518, filed on May 13, 2002.

(51) Int. Cl.
*G06F 15/173* (2006.01)
*G06F 15/16* (2006.01)
(52) U.S. Cl. .................. 709/226; 709/232; 709/233
(58) Field of Classification Search ........ 709/226–229, 709/232–233, 224
See application file for complete search history.

(56) References Cited

U.S. PATENT DOCUMENTS

| | | | | |
|---|---|---|---|---|
| 5,673,393 A | * | 9/1997 | Marshall et al. | 709/226 |
| 5,745,694 A | * | 4/1998 | Egawa et al. | 709/226 |
| 5,793,978 A | * | 8/1998 | Fowler | 709/226 |
| 5,819,043 A | * | 10/1998 | Baugher et al. | 709/222 |
| 5,850,181 A | | 12/1998 | Heinrich et al. | |
| 5,884,037 A | * | 3/1999 | Aras et al. | 709/226 |
| 6,085,241 A | * | 7/2000 | Otis | 709/223 |
| 6,092,113 A | * | 7/2000 | Maeshima et al. | 709/226 |
| 6,125,396 A | * | 9/2000 | Lowe | 709/234 |
| 6,125,397 A | * | 9/2000 | Yoshimura et al. | 709/235 |
| 6,205,484 B1 | * | 3/2001 | Eriksson | 709/226 |
| 6,292,834 B1 | | 9/2001 | Ravi et al. | |

(Continued)

OTHER PUBLICATIONS

Yavatkar, R et al. RFC 2814. SBM (Subnet Bandwidth Manager): A Protocol for RSVP-based Admission Control over IEEE 802-style networks. www.rfc-editor.org. The Internet Society. May 2000.*

(Continued)

*Primary Examiner*—Jason D Cardone
*Assistant Examiner*—Jeffrey R Swearingen
(74) *Attorney, Agent, or Firm*—Wolf, Greenfield & Sacks, P.C.

(57) ABSTRACT

An improved method and system for optimizing the allocation of bandwidth within a network system is presented. When a client device is engaged in communication with a remote computing device, an access point measures the throughput of the connection between the client device and the network. If the throughput is less than the amount of bandwidth reserved for usage by the client device, the access point adjusts the amount of bandwidth allocated for the client device to an amount equivalent to the measured throughput multiplied by an error variance factor. This process is then repeated periodically for the duration of the communication between the client device and the remote computing device in order to continually adapt the bandwidth allocation of the client device. Optionally, the method and system can be also deployed in client devices instead of the access point.

15 Claims, 7 Drawing Sheets

U.S. PATENT DOCUMENTS

| | | | |
|---|---|---|---|
| 6,466,980 B1* | 10/2002 | Lumelsky et al. | 709/226 |
| 6,587,875 B1* | 7/2003 | Ogus | 709/223 |
| 6,671,724 B1 | 12/2003 | Pandya et al. | |
| 6,799,209 B1 | 9/2004 | Hayton | |
| 6,807,165 B2 | 10/2004 | Belcea | |
| 6,829,643 B1* | 12/2004 | Tobe et al. | 709/226 |
| 6,839,768 B2 | 1/2005 | Ma et al. | |
| 7,257,640 B1* | 8/2007 | Callocchia et al. | 709/233 |
| 2003/0203740 A1 | 10/2003 | Bahl et al. | |
| 2004/0179469 A1 | 9/2004 | Attar et al. | |
| 2004/0181569 A1 | 9/2004 | Attar et al. | |

OTHER PUBLICATIONS

Sundaram, Vijay et al. "Bandwidth Allocation in a Self-Managing Multimedia File Server." Proceedings of the Ninth ACM International Conference on Multimedia. Ottawa, Canada. ACM Press. Oct. 2001. pp. 291-301.*

Bartal, Yair et al. "Fast, fair, and frugal bandwidth allocation in ATM networks." Proceedings of the tenth annual ACM-SIAM symposium on Discrete algorithms SODA'99. Society for Industrial and Applied Mathematics. Jan. 1999. 92-101.*

Benini, Luca et al., "Monitoring System Activity for OS-Directed Dynamic Power Management", In *Proceedings of 1998 ACM ISLPED*, pp. 185-190.

Benini, Luca et al., "Dynamic Power Management of Electronic Systems", in *Proceedings of the 1998 IEEE/ACM ICCAD*, Nov. 8-12, 1998, San Jose, CA, pp. 696-702.

Hinckley, K. et al., "Sensing Techniques for Mobile Interaction", *ACM UIST 2000 Symposium on User Interface Software & Technology*, CHI Letters 2 (2), pp. 91-100.

*Intel Microsoft Toshiba*, "Advanced Configuration and Power Interface", Revision 1.0, Feb. 2, 1999, 323 pages.

Simunic, Tajana et al., "Dynamic Power Management for Portable Systems", in *Proceedings of ACM MOBICOM 2000*, Aug. 2000, Boston, MA, pp. 11-19.

Simunic, Tajana et al., "Dynamic Voltage Scaling and Power Management for Portable Systems", in *Proceedings of ACM DAC 2001*, Aug. 2001, pp. 524-529.

Fleishman, Glenn, New Wireless Standards Challenge 802.11b, The O'Reilly Network, at http://www.oreillynet.com/lpt/a//wireless/2001/05/08standards.html (Jun. 8, 2001), pp. 1-4.

Flickenger, Rob, 802.11B Tips, Tricks and Facts, The O'Reilly Network, retrieved from http://www.oreillynet.com/lpt/a//wireless/2001/03/02/802.11b facts.html (Mar. 2, 2001), pp. 1-3.

Press Release, "Atheros Communications, Atheros Ships Combo Rolling Three WLAN Standards into a Single Solution", retrieved from www.atheros.com/news/combo/html (Mar. 11, 2002), pp. 1-3.

Atheros Communications, AR5001X Combo WLAN Solution Brochure, retrieved from www.atheros.com, pp. 1-2.

Nobel, Carmel, "For WLAN, It's 802.11bm Eweek", retrieved from www.eweek.com/print_article/0.3668.a=18648.00.asp, (Nov. 19, 2001), pp. 1-2.

Nandagopal, T. et al., "A Unified Architecture for the Design and Evaluation of Wireless Fair Queueing Algorithms", ACM MobiCom 1999, in *Proceedings of the Fifth Annual ACM/IEE International Conference on Mobile Computing and Networking*, (Aug. 1999), pp. 132-142.

Keshav, S., "On the Efficient Implementation of Fair Queueing", *Internetworking, Research and Experience*, vol. 2, No. 3, 157-173 (1991).

Bharghavan, V. et al., "Fair Queuing in Wireless Networks: Issues and Approaches", *IEEE Personal Communications Magazine*, pp. 44-53, (Feb. 1999).

Parekh, A.K. et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1993).

Parekh, A.K. et al., "A Generalized Processor Sharing Approach to Flow Control in Integrated Services Networks: The Multiple Node Case", *IEEE/ACM Transactions on Networking*, vol. 2, No. 2, pp. 137-150 (Mar. 1994).

NG, T.S., "Packet Fair Queueing: Algorithms for Wireless Networks with Location-Dependent Errors", *Proceedings of IEEE INFOCOM '98, The Conference on Computer Commutations vol. 3, Seventh Annual Joint Conference of the IEEE Computer and Communications Societies*, pp. 1103-111 (Mar. 1998).

Lettieri et al., "Advances in Wireless Terminals", *IEEE Personal Communications*, vol. 6, No. 1, (Feb. 1999), pp. 6-19.

Yung-Hsiang Lu et al., "Requester-Aware Power Reduction", *IEEE*; Sep. 20, 2000, pp. 18-23.

Benini et al., "System-level Dynamic Power Management", Low-Power Design, 1999; Proceedings. IEEE Alessandro Volta Memorial Workshop on Como, Italy, Mar. 4-5, 1999, Los Alamitos, CA, USA, *IEEE Comput. Soc*, US, Mar. 4, 1999, pp. 23-31.

Liu, Jun et al., "Using Loss Pairs to Discover Network Properties", *ACM SIGCOM Internet Measurement Workshop*, 2001, 12 pages.

Zhang, Yin et al., "On the Constancy of Internet Path Properties", *SIGCOM Internet Measurement Workshop*, 2001, 15 pages.

Lai, Kevin et al., "Measuring Link Bandwidths Using a Deterministic Model of Packet Delay", in *Proceedings of ACM SIGCOM 2000*, 12 pages.

Balakrishnan, Hari et al., "Analyzing Stability in Wide-Area Network Performance", in *Proceedings of CAN SIGMETRICS Conference on Measurement & Modeling of Computer Systems*, Seattle, WA, Jun. 1997, 11 pages.

Yavatkar, R. et al., "SBM (Subnet Bandwidth Manager): A Protocol for RSVP-based Admission Control Over IEEE 802-style Networks", IETF RFC 2814, retrieved from http://www.faws.org/rfcs/rfc2814.html on May 19, 2002.

Breslau, Lee et al., "Endpoint Admission Control: Architectural Issues and Performance", in *Proceedings of ACM SIGCOMM 2000*, pp. 57-69.

Chiasserini, Carla, F., "Combining Paging with Dynamic Power Management", in *IEEE INFOCOM 2001*, pp. 996-1004.

Shih, Eugene et al., "Wake on Wireless: An Event Driven Energy Saving Strategy for Battery Operated Devices", MOBICOM '02, Sep. 23-26, 2002, pp. 1-12.

Kleynhans, Steve, "*IBM: Back in the PC Game*", retrieved from http://www.techupdate.zdnet.com/techupdate/stories/main/0,14179,2868907-2,00html (last visited Sep. 16, 2002).

Wayports Successful Trail of Microsoft Windows XP and 802.1x Forecasts a More Secure Environment for Wireless Users, *HITCH Online 2002 edition* at http://online.hitec.org/news/4009856,20000343.htm (last visited Sep. 16, 2002).

"Wireless LAN Computing with IBM Personal Device", *IBM White papers*, IBM Personal Systems Group, Dec. 2001, 9 pages.

Bowman, Barb, "Unplugged and Unwired", *Microsoft Corporation* at http://www.microsoft.com/windowsxp/expertzone/columns/bowman/june11.asp (last visited Sep. 16, 2002).

"Windows XP Segment Analysis of the IBM ThinkPad Notebook Platform", *Strategic Relationship Marketing*, Oct. 2001, 1 page.

"Boingo Launches Nationwide WI-FI Service", Boingo Press Releases at http.//www.boingo.com/pr/pr3/html (last visited Sep. 20, 2002.

"Boingo Wireless Announces Founding and Funding", Boingo Press Releases at http://www.boingo.com/pr/pr1/html (last visited Sep. 20, 2002).

"802.11b has reached escape Velocity", Boingo Wireless Market Overview at http://www.boingo.com/marketoverview.html (last visited Sep. 20, 2002).

Chan, Sharon Pian, Wireless where you want: WI-FI is the guerrilla revolution of wireless computing, *Seattle Times Wireless where you want it* at http://www.seattletimes.nwsource.com/htm/businesstechnology/134402814wirelesslan11.html (last visited Sep. 20, 2002).

*Wireless Technology, Wireless Technology* at http/www.microsoft.com/hwdev/wireless (last visited Dec. 8, 2000).

Lough, Daniel L. et al., *A Short Tutorial on Wireless LANs and IEEE 802.11* at http://www.computer.org/students/looking/summer97/ieee8702.htm (last visited Dec. 12, 2000), 5 pages.

Mubashir, Alam, *Description Analysis of IEEE 802.11 Standard for Wireless Networks*, at http://www.triton,cc.gatech.edu/ubicomp.257 (last visited Dec. 12, 2000).

"*Zero Configuration Networking* (zeroconf)" at http://www.zeroconf.org (last visited Dec. 12, 2000).

Cheshire, Stuart, "Dynamic Configuration of IPv4 Link-local Addresses", Apple Computer, Oct. 8, 2000 at http://www.zeroconf.org/draft-ietf-zeroconf-ipv4-linklocal-00.txt (last visited Dec. 12, 2000).

Hattig, M., "*Zeroconf Requirements draft-ietf-zeroconf-reqts-06.txt*" (last visited Dec. 12, 2002).

"Enabling IEEE 802.11 Networks with Windows *Whistler*", at http://www.microsoft.com/hwdev/wireless/ieee802Net.htm (last visited Dec. 8, 2000).

*Specification of the Bluetooth System*, vol. 1, Dec. 1, 1999 (1,082 pages).

Miller, Brent et al., Mapping Salutation Architecture APIs to Bluetooth Service Discovery Layer (White Paper), vol. 1.0, IBM Corporation, Jul. 1, 1999 (pp. 1-26).

*IEEE Standard, 802.11, Part 11: Wireless LAN Medium Access Control (MAC) and Physical Layer (PHY) Specifications*, 1st Edition 1999 (512 pages).

O'Hara, Bob et al., "*IEEE 802.11 Handbook A Designer's Companion*", Dec. 1999 (174 pages).

Rigney, C. et al., "*Remote Authentication Dial in User Service(Radius)*", The Internet Society, Jun. 2000 (pp. 1-59).

Aboda, B. et al., RFC 2716, "*PPP EAP TLS Authentication Protocol*", The Internet Society, Oct. 1999 (pp. 1-19).

Blunk, L. et al., RFC 2284, "*PPP Extensible Authentication Protocol(EAP)*", The Internet Society, Mar. 15, 2000 (pp. 1-12).

IEEE 802.11 Security White Paper, Vol. 1, Windows Network Infrastructure Team, Microsoft Corporation, Mar. 15, 2000, pp.

IEEE 802.1X Supported Scenarios, Windows Network Infrastructure Team, Microsoft Corporation, vol. 1, Apr. 7, 2000 (7 pages).

Mettala, Riku et al., "*Bluetooth Protocol Architecture*", (White Paper), vol. 1.0, Nokia Mobile Phones, Sep. 29, 1999.

Muller, T., "*Bluetooth Security Architecture*", (White Paper), vol. 1.0, Jul. 15, 1999.

Guo et al., "Low power distributed MAC for ad hoc sensor radio networks", Proceedings of IEEE Global Telecommunications Conference (GLOBECOM '01), vol. 5, Nov. 25-29, 2001 retrieved from http://bwrc.eecs.berkeley.edu/People/Faculty/jan/publications/p137.pdf, on Feb. 3, 2005.

Intel, "Sample Installation Scenarios", Intel Wireless Gateway, pp. 1-3 (Oct. 9, 2001) retrieved from http://support.intel.com/support/wireless/wlan/gateway/sb/CS-008078.htm, on Feb. 3, 2005.

Maly, Kurt et al. "*Dynamic Bandwidth Allocation in a Network*" Symposium proceedings on Communications architectures and protocols. 1988, ACM Press, pp. 13-24.

Legout, Arnaud et al. "*Bandwidth-Allocation Policies for Unicast and Multicast Flows.*" IEEE/ACM Transactions on Networking. vol. 9, No. 4, Aug. 2001, pp. 464-478.

Kwon, T. et al. "*Bandwidth Adaptation Algorithms with Multi-Objectives for Adaptive Multimedia Services in Wireless/Mobile Networks*" Proceedings of the 2nd ACM international workshop on Wireless mobile multimedia. 1999, ACM Press, pp. 51-58.

\* cited by examiner

ADAPTIVE ALLOCATION OF LAST-HOP BANDWIDTH BASED ON MONITORING OF END-TO-END THROUGHPUT

CROSS REFERENCE TO RELATED APPLICATION

This application is a division of U.S. patent application Ser. No. 10/144,518, filed May 13, 2002, entitled ADAPTIVE ALLOCATION OF LAST-HOP BANDWIDTH BASED ON MONITORING OF END-TO-END THROUGHPUT and now pending.

TECHNICAL FIELD OF THE INVENTION

The present invention relates generally to quality of service within a network environment, and more particularly to methods and systems for optimizing the bandwidth usage of a network system to enhance quality of service.

BACKGROUND

Bandwidth is a term that describes the rate at which data can be transmitted across a network path connecting one or more computers. The faster data is exchanged between computers or other nodes, the higher the bandwidth is said to be for that connection. Conversely, the slower data is exchanged, the lower the bandwidth is said to be for that connection. Thus, bandwidth relates to the amount of data exchanged over the network by a computer or node over time.

Typical network systems such as local area networks (LANs) or wide area networks (WANs) are limited to only a certain amount of bandwidth that is available for use by one or more computers or nodes that comprise the system. To accommodate the varying requirements of the network bandwidth users (e.g., any entity requiring bandwidth), the available bandwidth must be effectively apportioned among the users, while as much as possible, maintaining acceptable performance for the entire network system. Bandwidth allocation is the process of distributing the available bandwidth within a network system amongst one or more users.

One of the most widely used bandwidth allocation techniques involves segmenting a total available bandwidth into equal blocks, and assigning a block of bandwidth to each user within the system. The assigned block indicates the rate at which each computer within the system may transmit data to another computer across the network. Typically, an access server or access point that manages bandwidth resources within the network system performs this assignment or allocation technique. By segmenting the bandwidth, each connected computer is assigned a certain fixed amount of bandwidth for which to perform its particular network tasks. For example, if the network system makes 1 Mbps (megabits per second) of bandwidth available to perform a specific function, and there are ten connected computers, each connected computer is assigned a 100 Kbps (kilobits per second) block of bandwidth (1 Mbps available bandwidth divided by 10 computers). However, this technique has limited effectiveness as it can result in significant under utilization of bandwidth. Not every computer may actually use all of its 100 Kbps of assigned bandwidth, such as due to other network bottlenecks (e.g., a slow link in the Internet or heavy Internet traffic) or constraints in the computer or application itself that impede the rate at which data may be transmitted from the computer and across the network. As a result, more bandwidth ends up being reserved than is actually used, preventing the unused bandwidth from being put to better use. Likewise, a computer that needs more than the allotted amount will be prevented from gaining access to the required bandwidth.

Another bandwidth allocation technique in use today involves segmenting available bandwidth across an entire network path between one or more computers. This bandwidth allocation technique is based on the premise that if the bandwidth is distributed equitably across the entire path, then no under utilization (over assignment) of bandwidth can occur and optimal performance is achieved. As an example of this technique, consider a first computer tied to a first network system, and a second computer tied to a second network system that communicates with the first network system via the Internet. The network path between the two computers includes the various computing devices within each respective network system (e.g., access servers, routers, proxies) as well as potentially a multitude of computing devices within the Internet itself. The bandwidth allocation technique would, in this scenario, require calculating the available bandwidth of the entire network path between the first and second computer, and then assigning blocks of bandwidth accordingly. While this technique can prove effective, it requires a significant amount of state information to be constantly maintained and transferred by each of the computing devices to one another in order to account for constantly changing network conditions. As a result, the amount of traffic placed on the network in sharing this information degrades the performance of the network, and thus limits the available bandwidth across the network path. Moreover, if the path between the first and second computers includes one or more computing devices that are not able to generate or interpret state information, this bandwidth allocation technique is rendered useless.

SUMMARY

To address the challenges described above, a method and system are disclosed for optimizing the allocation of bandwidth within a network system. Also, a method and system are disclosed for preventing the under utilization of bandwidth within a network system due to network or other influences. Network systems include, but are not limited to, local area networks (LANs), wide area networks (WANs), metropolitan area networks (MANs), wireless networks of any type alone or in combination with any other type, and any other systems that employ an access point or access server to interface with the network.

In accordance with an embodiment of the invention, a network system (e.g., an intranet) comprises an access point that employs a bandwidth allocation mechanism to affect the usage of bandwidth within the network system. Specifically, the access point is an intermediate computer device that acts as an interface between a network, such as the Internet, and one or more client devices. The one or more client devices also comprise the network system, and can communicate over the network with one or more remote computing devices (perhaps part of a different or the same network system) via the access point. In order to engage in communication over the network (e.g., externally to an intranet), a client device connects to the access point and submits a bandwidth reservation request seeking permission from the access point to utilize a certain amount of the bandwidth of the access point. The access point determines whether the request is serviceable, and if so, allocates the requested amount of bandwidth for use by the requesting device accordingly.

As a client device is engaged in communication with a remote computing device via the network, the access point periodically performs preferably passive throughput measurement to determine the current performance of the network. Such throughput measurement may be performed actively in another embodiment. Alternatively, the client device performs the throughput measurement itself and submits the results to the access point. With respect to a network environment, throughput is a measure of the effective rate at which data is passed through the network over a period of time, and corresponds closely to the bandwidth capacity of a device. The throughput is limited by the bandwidth of network links and the number of concurrent connections sharing the link.

If the access point determines that the throughput for a device is less than the amount of bandwidth reserved for use by that device, this indicates to the access point that the reserved bandwidth is not being effectively used. In response to such a determination, the access point adjusts the amount of bandwidth allocated for that device to an amount equivalent to the measured throughput, or to an amount equivalent to the measured throughput multiplied by an error variance. The above-described process is then periodically repeated for the duration of the communication between the client device and the remote computing device. By adapting the allocation in this way, the amount of unused bandwidth is minimized, optimizing the performance and capability of the network system, without degrading performance.

In accordance with another embodiment of the invention, an access point performs bandwidth allocation for a newly connected device based on the amount of bandwidth allocated for a related device. In particular, when a new client device forms a connection with the access point, it sends a bandwidth reservation request to the access point to request enough bandwidth to perform a particular network task (e.g., to transmit a segment of video data across the network). However, because the new client device is recently connected to the access point, the access point is unable to determine an optimal bandwidth allocation for the device that would prevent bandwidth under usage. So, in response to the reservation request, the access point performs a check to determine if the new client device has similar bandwidth affecting criteria as an already connected device. Bandwidth affecting criteria includes any characteristic(s) related to a client device that can be used to measure or estimate the actual future throughput for the device. Such criteria include, but are not limited to the IP address of a client device or group network location, an application data rate for an application executing upon the device, or a particular application type.

When the access point determines that the newly connected client device shares one or more similar bandwidth affecting criteria with another client device already connected to the access point, the access point assigns the same amount of bandwidth to the new client device as it did the already connected client device. For example, if the new client device shares a similar IP address (e.g., share the same 24-bit address prefix) or network location as an already connected client device having an allocated bandwidth of 133 Kbps, the access point assigns 133 Kbps of bandwidth to the new client device as well. In doing so, the access point ensures that the most recent optimal bandwidth allocation for the already connected client devices applies to the new client device as well.

Additional features and advantages of the invention will be made apparent from the following detailed description of illustrative embodiments made with reference to the accompanying figures.

BRIEF DESCRIPTION OF THE DRAWINGS

While the appended claims set forth the features of the invention with particularity, the invention and its advantages may be best understood from the following detailed description taken in conjunction with the accompanying drawings, of which:

DETAILED DESCRIPTION

A method and system are described for optimizing the bandwidth allocation within a network system. Also, a method and system are disclosed for preventing the under utilization of bandwidth within a network system due to network influences. As used herein, "networks" and "network systems" include, but are not limited to, local area networks (LANs), wide area networks (WANs), metropolitan area networks (MANs), wireless networks and any other computer system configurations involving one or more nodes having at least one intermediary device, such as an access point or access server. Generally, the network system is comprised of one or more client devices, servers, routers, hubs, or other computing devices that interact with one another to facilitate communication between end points. With respect to such systems, bandwidth allocation refers to any mechanism for distributing the total amount of bandwidth available to the system effectively among various computing devices competing for that bandwidth.

Also, as used herein, "network communication" is the transmission of data between computing devices using a network communication protocol. Suitable protocols for facilitating network communication include, but are not limited to, wireless protocols such as pursuant to the IEEE 802.11 standard, or IP based protocols such as the user datagram protocol (UDP) and the real-time transport protocol (RTP). To facilitate the communication, a series of connections, transient or otherwise, must be established between the devices by means of a protocol, resulting in the formation of an interconnecting path or paths between the devices. Throughout the course of the detailed description, general reference will be made to communication between devices over a network, such as the Internet. However, those skilled in the art will recognize that the various embodiments of the invention apply to communication within a network system as well, such as within an intranet.

Figure 1:
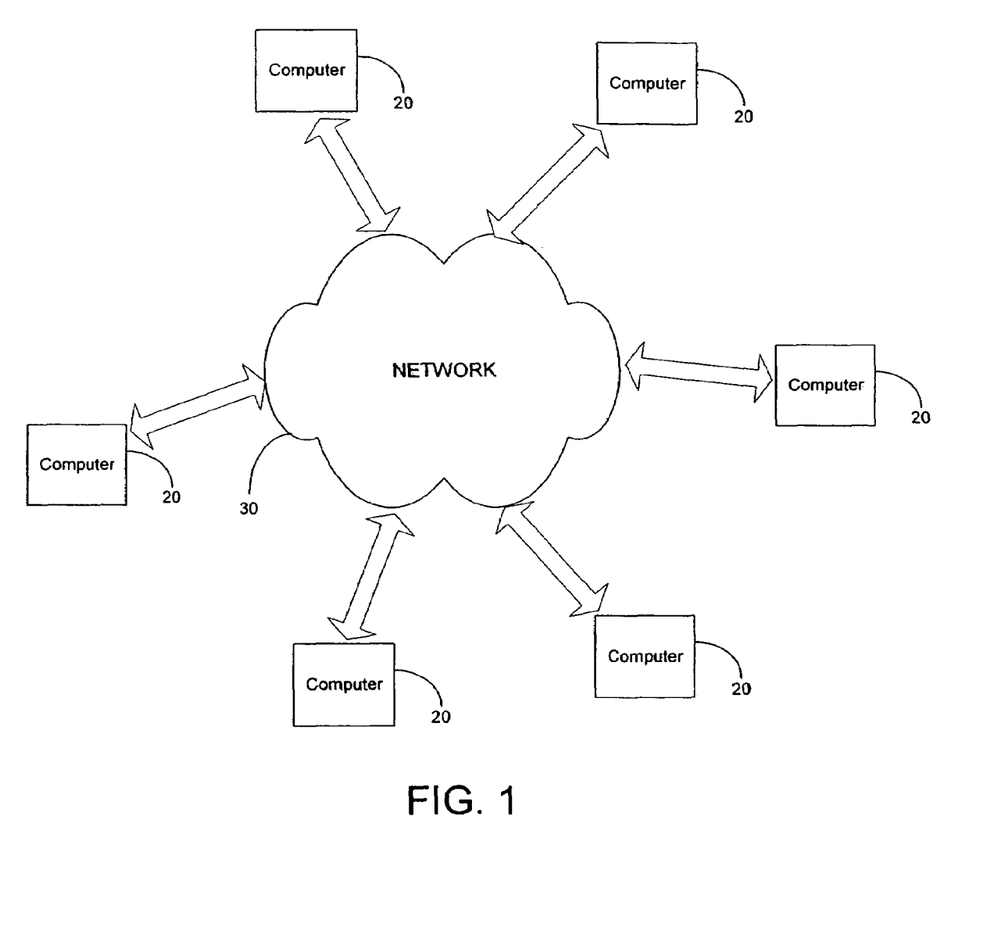
FIG. 1 is a schematic diagram of an exemplary computer network.

An example of a network environment in which embodiments of the invention may be implemented will now be described with reference to FIG. 1. The example network environment includes several computing devices 20 communicating with one another over a network 30, such as the Internet, as represented in the figure by a cloud. Network 30 may include one or more well-known components, such as routers, gateways, hubs, etc. and may allow the computers 20 to communicate via wired and/or wireless media using transient (e.g., packet switched) or fixed (e.g., circuit switched) links.

Figure 2:
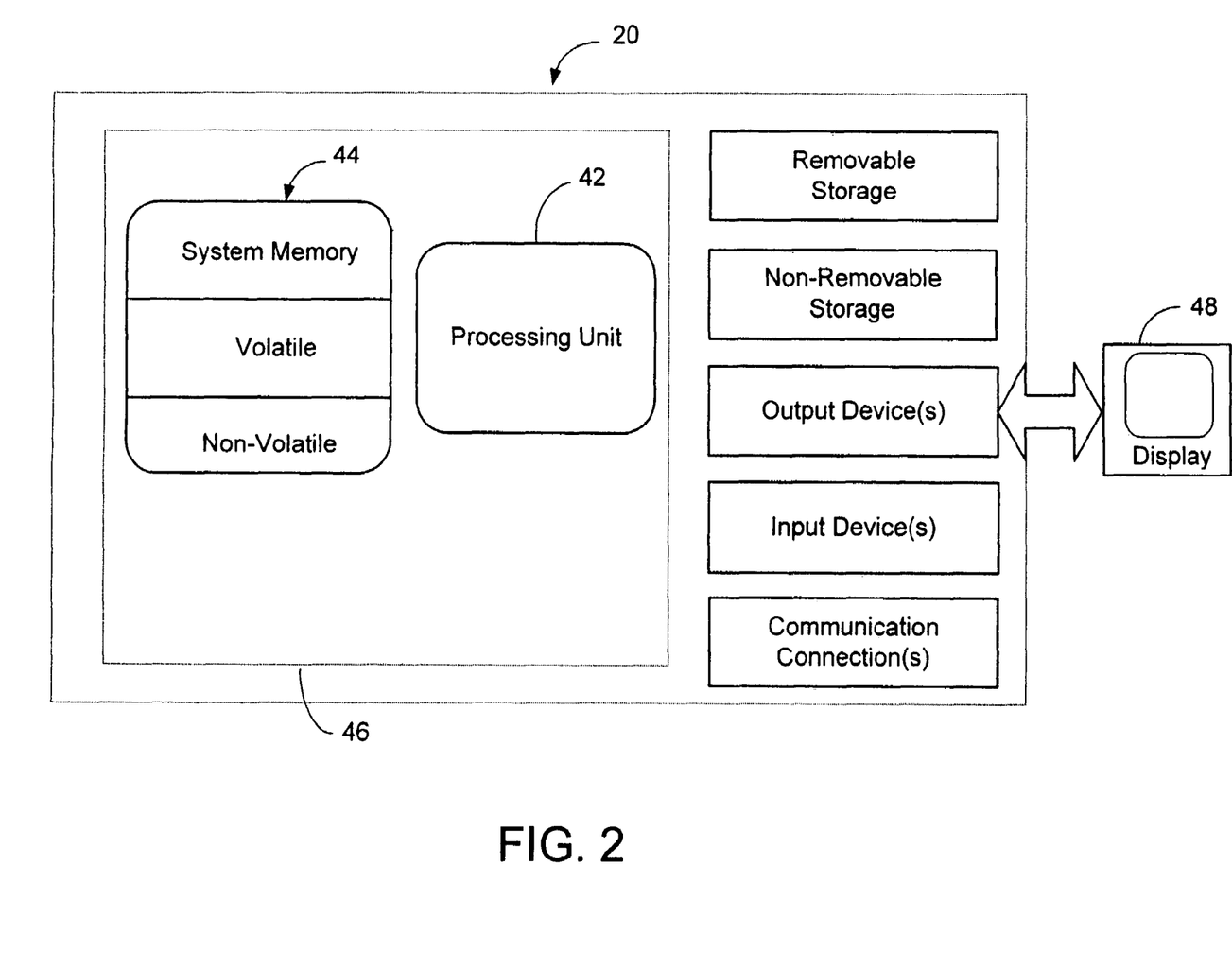
FIG. 2 is a schematic diagram illustrating the architecture of an exemplary computing device for operating within the exemplary network according to an embodiment of the invention.

Referring to FIG. 2, an example of a basic configuration for a computing device on which the systems described herein may be implemented is shown. In its most basic configuration, the computing device 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computing device may also have other features/functionality. For example, computer 20 may also include additional storage (removable and/or non-removable) including, but not limited to, magnetic or optical disks or tape. Computer storage media include volatile and non-volatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computing device 20. Any such computer storage media may be part of the computing device 20.

The computing device 20 preferably also contains communications connections 48 that allow the device to communicate with other devices. A communication connection is an example of a communication medium. Communication media typically embody readable instructions, data structures, program modules or other data in a modulated data signal such as a carrier wave or other transport mechanism and include any information delivery media. By way of example, and not limitation, communication media include wired media such as a wired network or direct-wired connection, and wireless media such as acoustic, RF, infrared and other wireless media. The term computer readable media as used herein includes both storage media and communication media.

The computing device 20 may also have input devices such as a keyboard, mouse, pen, voice input device, touch input device, etc. Output devices such as a display 48, speakers, a printer, etc. may also be included. All these devices are well known in the art and will not be discussed at greater length here.

Figure 3:
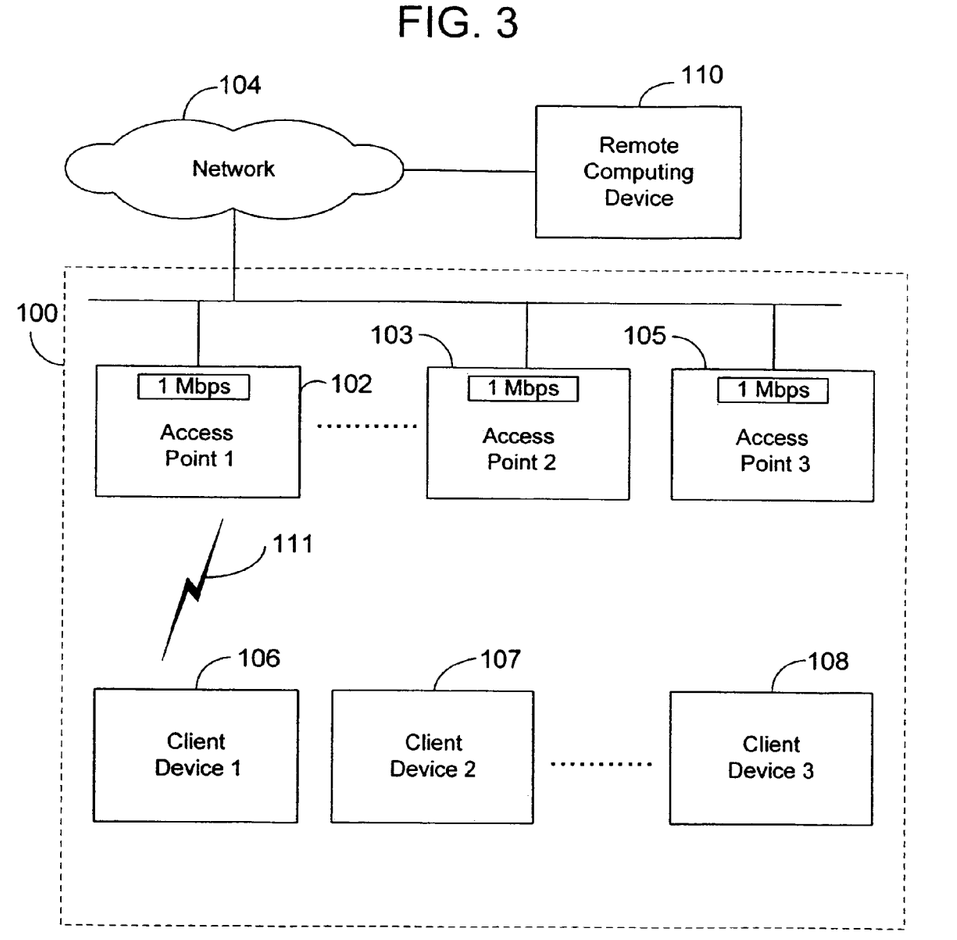
FIG. 3 is a schematic diagram illustrating an exemplary operating environment within which an access point or access server can implement a bandwidth allocation mechanism according to an embodiment of the invention.

In accordance with an embodiment of the invention, a network system 100 includes an access point 102 for interfacing one or more client devices 106-108 to a network 104, as illustrated in FIG. 3. Specifically, the access point 102 is an intermediate computing device that acts as an interface between a network 104, such as the Internet, and one or more client devices 106-108. Depending on the network needs of the entity or organization that employs the network system, the network system 100 may also comprise one or more other access points 103 and 105 to accommodate a greater number of client devices. Each access point 102, 103 and 105 provides a certain amount of outgoing and incoming bandwidth on behalf of the network system 100, and regulates how the various computing devices 106-108 of the network system 100 may use the bandwidth to perform network tasks. The amount of bandwidth available is dependent upon numerous factors, including the processing speed of the access points 102, 103, and 105, the capabilities of any hubs, routers, or switches employed by the network system 100 and network 104, and the connection types (e.g., T1, modem) used to interconnect network devices. In FIG. 3, each access point is shown to provide an amount of bandwidth equal to 1 Mbps (megabit per second). This value is of course for example purposes, as any other bandwidth capacity may exist for each access point instead.

The client devices 106-108 are also computing devices, and can communicate over the network 104 with one or more remote computing devices, such as remote computing device 110. In order to engage in communication over the network 104, the client devices 106-108 must first establish a connection with one of the access points. As an example of the interaction that takes place between the access point and client devices, when the first client device 106 wishes to communicate over the network 104 with the remote device 110, it initially forms a connection with the first access point 102. The first client device 106 forms such a connection by submitting a connection request message to the first access point 102 via a suitable protocol, and commencing a handshaking process (well known in the art) with the access point 102. Generally, a connection request is generated and initiated by a software application executing upon a client device, such as a web browser or e-mail utility. Alternatively, the connection request can be initiated by a program module operable upon a client device for invoking a network login or registration process, thus connecting the client device within the network system. In either case, the connection can be wireless, wired, or a combination thereof. A connection between the first client device 106 and the first access point 102 is shown in the figure as a bolted arrow 111.

Once a connection 111 is properly established between the first access point 102 and the first client device 106, a bandwidth reservation request message is sent to the first access point 102. The bandwidth reservation request is made by the first client device 106 for a certain amount of bandwidth to perform a particular network task. Network tasks may include the transmission or receiving of video, voice, or multimedia data by a software application operating on the client device 106, or any other process that requires the exchange of data. In the illustrated example, the first client device 106 sends a request via the connection 111 to the access point 102 for the use of 100 Kbps of the access point's capacity. Upon receiving the request, the access point 102 determines whether it can accommodate the request. The determination can be based on various factors, including but not limited to, the amount of available bandwidth (1 Mbps), the number of already connected devices, the particular type of application that initiated the request, etc.

When the requested amount of bandwidth to be allocated is determined to be acceptable by the first access point 102, the access point 102 informs the first client device 106 that the request is granted. The first access point 102 then allocates the requested amount of bandwidth to the first client device 106 accordingly, and records the amount of bandwidth now available [available bandwidth=1 Mbps–100 Kbps=900 Kbps in the example]. Having received its requested amount of bandwidth, the first client device 106 is able to engage in a communication with the remote computing device 110 at a data transfer rate of 100 Kbps.

In accordance with another embodiment of the invention, the first access point 102 employs a bandwidth allocation mechanism based upon measured throughput rates for a client connection to prevent bandwidth under utilization. This allocation mechanism is illustrated with respect to the flowchart of FIG. 4. As the first client device 106 is engaged in communication with the remote computing device 110 via the network 104, a throughput measurement is periodically performed for the connection between the first client device 106 and the network 104 through the access point 102. This corresponds to event 120 of the flowchart of FIG. 4. The throughput measurement allows a measuring computing device (e.g., the access point) to determine the approximate rate of data exchange over a particular connection (such between the access point and the network), and can be measured actively or passively. Passive throughput measurement is performed by determining the number of bits transferred over a connection over a given time interval using existing connection state information, or existing data packet statistics. In contrast, active throughput measurement is performed by sending probing packets over the connection and determining the relative time delay between packets. Passive measurement is preferred, though not required, given that no new traffic need be placed onto the network to calculate the throughput. Those skilled in the art will recognize that various methods of throughput measurement for network systems exist, and that the present invention is not limited to any one implementation.

With respect to the illustrated embodiment, the throughput measurement for the connection between the first client device 106 and the network 104 can be performed by the first access point 102, or optionally by the first client device 106. In the latter case, the first client device 106 can periodically measure its throughput and provide this information to the first access point 102. It should be noted that the client-measured throughput may be less than the throughput measured by the access point if the access point adds additional protocol layers to outgoing transmissions. Either the client or the access point 102 may adjust for the discrepancy. Also, those skilled in the art will recognize that throughput can be measured in various ways, such as with respect to the rate of data transfer from the first client device 106 to the access point 102, etc.

The throughput of a connection between the first client 106 and the network 104 is limited when network conditions impede the rate of data passage through the network 104. If, the first access point 102 determines that the throughput is close to (generally, the throughput cannot exceed the allocated bandwidth) the amount of bandwidth allocated to the first client device 106, no adjustment to the amount of bandwidth allocated to the first client device 106 is made. This corresponds to event 121 of the flowchart. However, if the first access point 102 determines that the throughput is less than the amount of bandwidth allocated for usage by the first client device 106 as in event 123, this indicates to the first access point 102 that the reserved bandwidth (100 Kbps) is not being fully utilized. In response to this determination, the first access point 102 adjusts the amount of bandwidth allocated for the first client device 102 to minimize the wasting of bandwidth. This adjustment process corresponds to event 122 of FIG. 4, and is described in greater detail in the following paragraphs.

Figure 4:
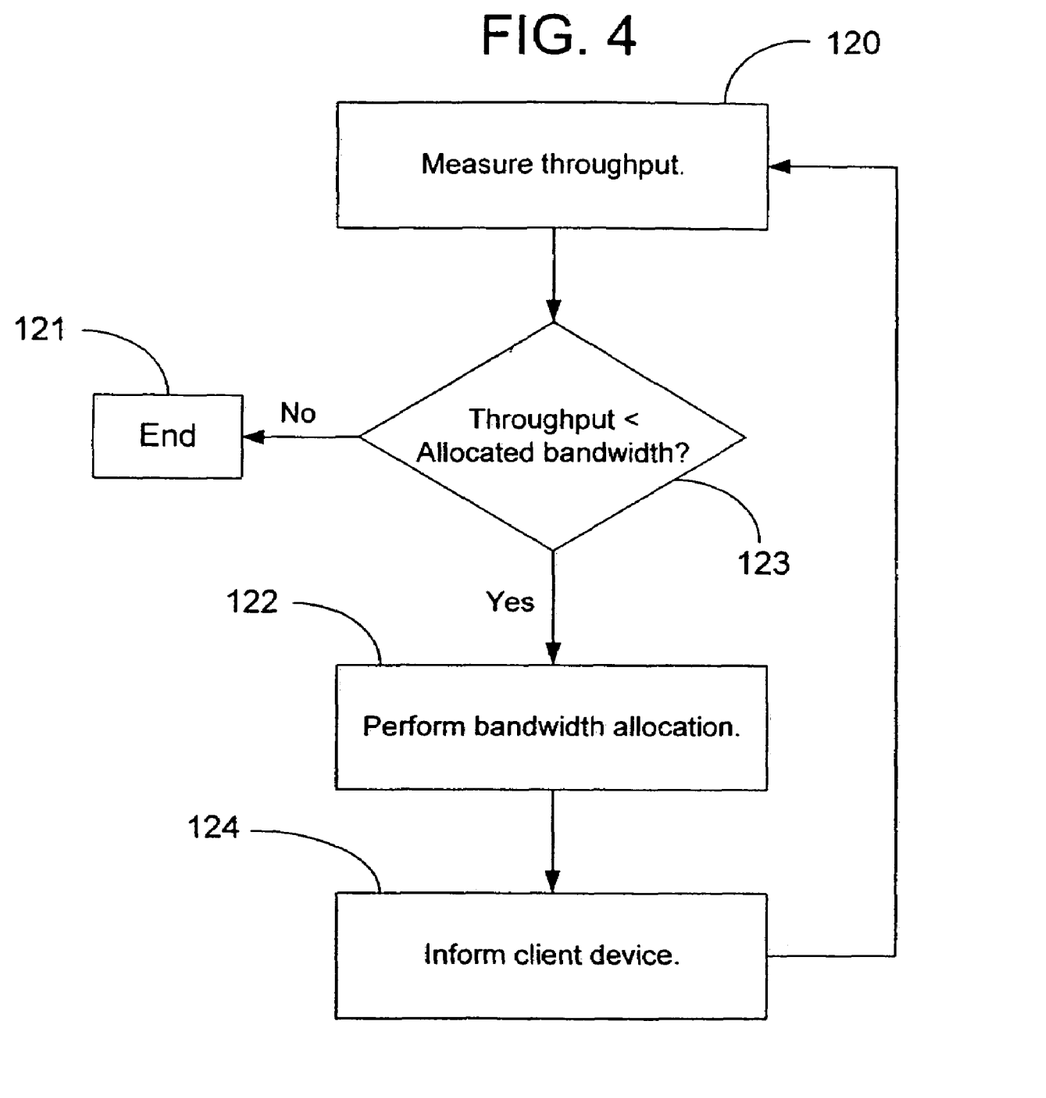
FIG. 4 is a flowchart illustrating a method of operation for an access point or access server while performing a bandwidth allocation mechanism according to an embodiment of the invention.

Once the throughput is determined to be less than the actual amount of bandwidth allocated or reserved for usage by the first client device 106, the first access point 102 adjusts the bandwidth for the first client device 106 in one of two ways. That is, it may adjust the bandwidth allocated for the first client device 106 to an amount equivalent to the measured throughput itself, or preferably, adjust the bandwidth allocated for the first client device or to an amount equivalent to the throughput multiplied by an error variance factor greater than one. An error variance factor is introduced to account for errors in throughput measurement. In practicality, the error variance factor is assigned as a value greater than or equal to one, and is a multiplier for the measured throughput value. The reason for setting the error variance factor greater than or equal is because standard throughput measurement techniques at best closely approximate the actual throughput, but may not precisely indicate this value. A value greater than or equal to one compensates for such occurrences. Moreover it allows for an increase in the initial bandwidth allocation when the Internet congestion is alleviated during the middle of the connection.

As an example of the first method of adjustment, if the throughput is measured to be 50 Kbps while the actual allocated bandwidth for the first client device 106 is 100 Kbps, then the first access point 102 allocates 50 Kbps to the first client device 106. In this case, the error variance factor is one. As a result of this adjustment, 50 Kbps of bandwidth is freed, which can be allocated by the first access point 102 to another connected client device upon request.

With the second method of adjustment, an error variance factor greater than one is specified. So, for example, if the error variance factor is 1.5 and the measured throughput is 50 Kbps, then the amount of bandwidth allocated for the first client device 106 is 75 Kbps [50 Kbps*1.5]. In this case, the error variance factor is such that it allows an extra amount of bandwidth to be allocated above the measured throughput amount. Both methods ensure to some degree that the reserved or allocated amount of bandwidth for the first client device 106 more closely matches the actual performance of the network. Once the adjustment is made, the first client device 106 is informed by the first access point 102 of this newly allocated amount of bandwidth, corresponding to event 124 of the FIG. 4.

Those skilled in the art will appreciate that the above stated error variance factors are exemplary, and in no way limit the scope or function of the invention. For instance, error variance factors other than 1 may be designated for the purposes of calculating the amount of bandwidth to be allocated to the first client device 106. The actual value for the error variance factor can be designated by the access point according to a policy or arbitration scheme, or by the network administrator of the network system 100. Given the wide variety of conditions that affect network performance, the error variance factor may vary from one network configuration to another. For example, in network system configurations where throughput measurements tend to be higher in value than the actual throughput, and error variance factor less than one may be used.

The first access point 102 periodically repeats the bandwidth allocation process for the duration of the communication between the first client device 106 and the remote computing device 110. This is shown in the figure as a path leading from event 124 to event 120. In doing so, the amount of bandwidth allocated to the first client device 106 is continually adjusted in accordance with changes in the measured throughput. In instances where the measured throughput is determined to be greater than the amount of bandwidth allocated to the first client device 106, the first access point 102 can allocate an amount equal to the minimum of the amount of bandwidth initially reserved by the first client device 106 and an amount equivalent to the measured throughput multiplied by any error variance factor. This determination is given by the following equation:

> Amount of bandwidth to be allocated=Min (bandwidth allocated originally, error variance factor*measured throughput), wherein the bandwidth allocated originally=amount reserved by the client device initially.

By adjusting the amount of bandwidth allocated for the first client device 106 according to this relationship, the first access point 102 is able to throttle (up or down) the bandwidth allowance of the first client device 106. This is advantageous in that it allows the point of network entry—the access point 102 (or an access server)—to manage the limited bandwidth resources for maximum efficiency.

Up to this point, an embodiment of the invention for optimizing the bandwidth allocation process for a network system 100 to prevent the under utilization of bandwidth by one or more client devices has been described. This operation of the invention is described in the foregoing paragraphs with respect to the interaction between the first client device 106 and the first access point 102. Those skilled in the art will recognize however that the process described above also applies to the interaction between any other access points 103, 105 and associated client devices 107 and/or 108. Furthermore, it will be appreciated by those skilled in the art that the above described bandwidth allocation process can be performed by other computing devices in the network system 100 for managing network access, such as an access server. By adjusting the bandwidth allocation throughout a communication, the amount of allocated bandwidth left unused by each client device is minimized, optimizing the performance and capability of the network system 100.

Figure 5A:
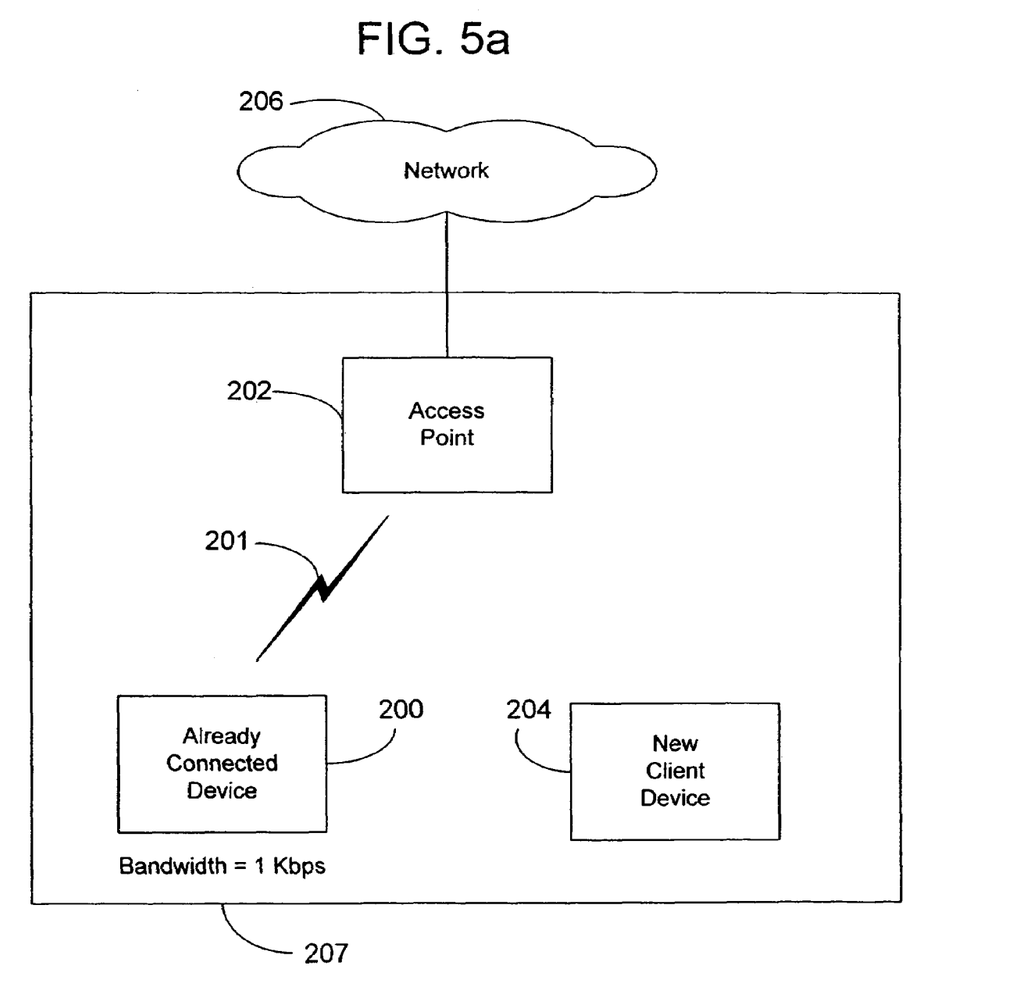
FIGS. 5a and 5b are diagrams illustrating a method of operation in accordance with an embodiment of the invention for allocating bandwidth to a newly connected client device.
Figure 5B:
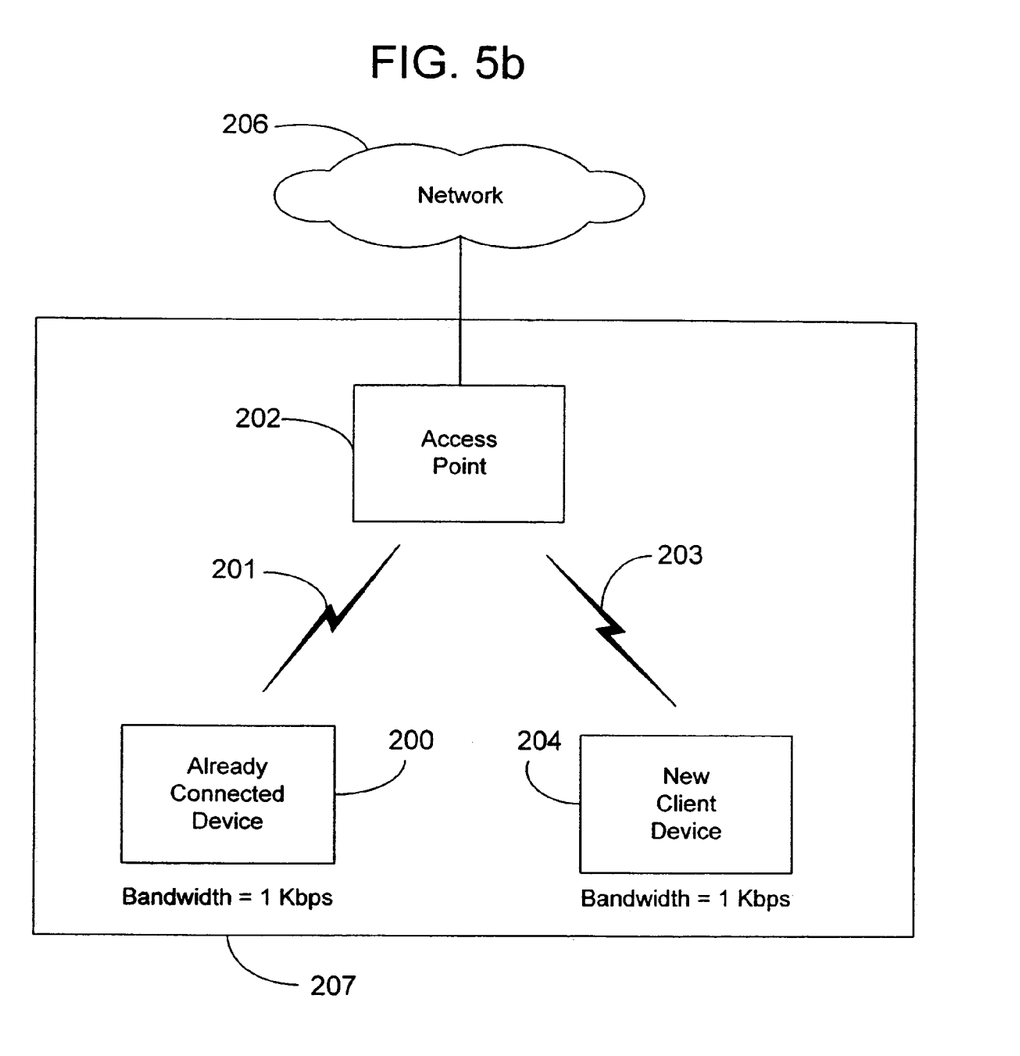
Figure 6:
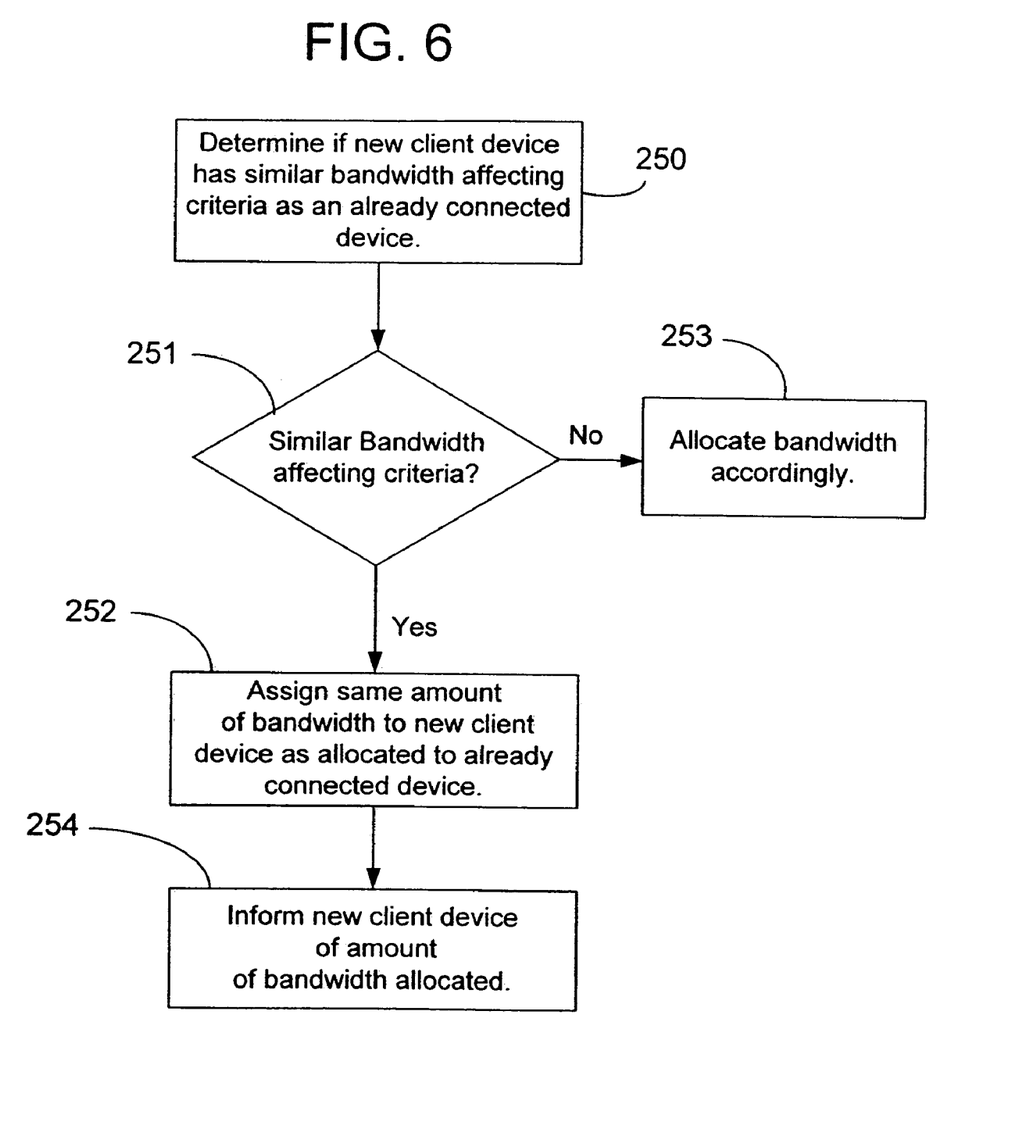
FIG. 6 is a flowchart illustrating the operation of an access point or access server while allocating bandwidth for a newly connected client device according to an embodiment of the invention.

In accordance with a further embodiment of the invention, an access point employs a bandwidth allocation technique for a newly connected client device based on the amount of bandwidth allocated for an already connected device, as shown in FIGS. 5a-b and the flowchart of FIG. 6. An "already connected" device refers to a client device that has already formed a connection with an access point or access server, and that already has an amount of bandwidth allocated to it for usage. Conversely, a "newly connected" device refers to a new client device that has recently connected to the access point or access server. It should be noted that an already connected device may in fact may in fact be a newly connected device if for instance, it were to be unconnected for some period of time and reestablished a connection with an access point. In FIG. 5a, an already connected client device 200 with an allocated bandwidth of 1 Kbps is shown to have an established connection 201 with an access point 202, while a new client device 204 is shown to have no connection and no amount of bandwidth allocated. Once the new client device 204 establishes a connection 203 with the access point 202, as in FIG. 5b, it sends a bandwidth reservation request to the access point 202 seeking enough bandwidth to perform a particular network task (e.g., to transmit video data across the network 206).

In response to the reservation request, the access point 202 performs a check to determine if the new client device 204 has similar bandwidth affecting criteria as an already connected device (event 250, FIG. 6). As noted earlier, bandwidth affecting criteria may be any characteristics related to the new client device 204 that are known to have an affect, adverse or otherwise, on the total bandwidth usage of the new client device 204 or on the network system 207 itself. This may include criteria such as the IP address of the new client device 207 or its group network location, an application data rate for an application executing upon the new client device 204, or a particular application type operating on the new client device 204. Such information is available to the access point by analyzing and comparing state information or network statistic data generated for a client device.

When the access point 202 determines that the new client device 204 shares one or more similar bandwidth affecting criteria as another client device already connected to it, the access point 202 assigns the same amount of bandwidth to the new client device 204 as it currently has assigned the already connected client device 200. As shown in FIG. 6, the determination process corresponds to event 251 while the assignment process corresponds to event 252. As an example of this operation within the network system 207, if the access point 202 determines that the new client device 204 is executing the same video conferencing application to communicate over the network 206 as the already connected device 200, which has been allocated 1 Kbps, then the access point assigns 1 Kbps of bandwidth also to the newly connected device 204. Once the amount of bandwidth allocated to the new client device 204 is established, the client is informed of the assigned amount, corresponding to event 254 of FIG. 6. Where no known bandwidth affecting criteria are associated with the new client device 204 and the already connected device 200, the bandwidth allocation can proceed as it did when the already connected device 200 connected with the access point 202, as in event 253.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Furthermore, those of skill in the art will recognize that the client device, as opposed to the access server or access point, can perform the bandwidth allocation mechanism. In this respect, a software application can be integrated for usage by the client device to monitor the device throughput and adjust its amount of requested bandwidth according to the methods described herein. Therefore, the invention as described herein contemplates all such embodiments as may come within the scope of the following claims and equivalents thereof.

What is claimed is:

1. A method for preventing the under utilization of reserved bandwidth by one or more client devices capable of communicating over a network by establishing a communicable link with an intermediate computing device that is communicably linked to the network, the method comprising:

receiving a bandwidth reservation request from a first client device;

determining whether the first client device has the same bandwidth requirement as at least one currently-connected client device; and assigning the first client device the same bandwidth as the at least one currently-connected client device if the first client device has the same bandwidth requirement as the at least one currently-connected client device.

2. The method of claim 1 further comprising, establishing a link between the intermediate computing device and the first client device.

3. The method of claim 1 further comprising informing the first client device of the amount of bandwidth it is assigned.

4. The method of claim 1 wherein the step of determining further comprises comparing state information related to the first client device with state information related to the at least one currently-connected client device.

5. A computer-readable medium having computer-executable instructions for performing the steps recited in claim 1.

6. The method of claim 1, wherein determining whether the first client device has the same bandwidth requirement as a currently-connected client device comprises determining whether an application is executing on both the first client device and the at least one currently-connected client device.

7. The method of claim 1, wherein determining whether the first client device has the same bandwidth requirement as a currently-connected client device comprises determining a degree of similarity between an IP address of the currently-connected client device and an IP address of the first client device.

8. A system for preventing the wasting of reserved bandwidth by one or more client devices capable of communicating over a network by establishing a connection with an intermediate computing device that is communicably linked to the network, the system comprising:
   means for receiving a bandwidth reservation request from a first client device having no current bandwidth allocation;
   means for determining whether the first client device has the same bandwidth requirement as a currently-connected client device; and
   means for assigning the first client device the same bandwidth as the currently-connected client device.

9. The system of claim 8 further comprising means for establishing a connection with the intermediate computing device by the first client device.

10. The system of claim 8 further comprising means for informing the first client device of the amount of bandwidth it is assigned.

11. The system of claim 8, wherein determining whether the first client device has the same bandwidth requirement as a currently-connected client device comprises determining whether an application is executing on both the first client device and the at least one currently-connected client device.

12. The system of claim 8, wherein determining whether the first client device has the same bandwidth requirement as a currently-connected client device comprises determining a degree of similarity between an IP address of the currently-connected client device and an IP address of the first client device.

13. A system for allocating bandwidth by one or more computers capable of communicating over a network by establishing a connection with an intermediate computing device that is linked to the network, the system comprising:
   means for receiving a bandwidth reservation request from newly-connected computer having no current bandwidth allocation;
   means for determining whether newly-connected computer has the same bandwidth requirement as a currently-connected computer by determining that applications executing on the currently-connected computer and the newly-connected computer have the same application data rate; and
   means for assigning newly-connected computer the same bandwidth as the currently-connected computer.

14. The system of claim 13 further comprising means for establishing a connection with the intermediate computing device by the newly-connected computer.

15. The system of claim 13 further comprising means for informing the newly-connected computer of the amount of bandwidth it is assigned.

* * * * *